United States Patent
Olaru et al.

(10) Patent No.: US 7,998,390 B2
(45) Date of Patent: Aug. 16, 2011

(54) MULTI-MATERIAL INJECTION MOLDING APPARATUS AND METHOD

(75) Inventors: George Olaru, Montreal (CA); Harold Godwin, Fergus (CA)

(73) Assignee: Mold-Masters (2007) Limited, Georgetown, Ontario (CA)

(*) Notice: Subject to any disclaimer, the term of this patent is extended or adjusted under 35 U.S.C. 154(b) by 303 days.

(21) Appl. No.: 12/423,524

(22) Filed: Apr. 14, 2009

(65) Prior Publication Data
US 2009/0256282 A1 Oct. 15, 2009

Related U.S. Application Data

(60) Provisional application No. 61/045,272, filed on Apr. 15, 2008.

(51) Int. Cl.
B29C 45/04 (2006.01)
B29C 45/16 (2006.01)

(52) U.S. Cl. ............ 264/255; 264/297.6; 264/328.8; 425/576; 425/572; 425/588

(58) Field of Classification Search ............ 264/255, 264/297.2, 297.6, 328.8; 425/547, 562, 572, 425/576, 588, 589
See application file for complete search history.

(56) References Cited

U.S. PATENT DOCUMENTS

| | | | |
|---|---|---|---|
| 3,752,615 A * | 8/1973 | Van Manen | ............ 425/130 |
| 4,243,362 A | 1/1981 | Rees et al. | |
| 4,330,257 A | 5/1982 | Rees et al. | |
| 4,444,711 A | 4/1984 | Schad | |
| 4,460,534 A | 7/1984 | Boehm et al. | |
| 4,734,023 A | 3/1988 | Nesch et al. | |
| RE35,256 E | 5/1996 | Von Buren | |
| 5,540,580 A | 7/1996 | Takada | |
| 5,620,723 A | 4/1997 | Glaesener et al. | |
| 5,910,327 A | 6/1999 | Schad et al. | |
| 6,709,251 B2 | 3/2004 | Payette et al. | |
| 6,835,060 B2 | 12/2004 | Sicilia | |
| 6,955,534 B2 | 10/2005 | Dewar | |
| 6,994,810 B2 | 2/2006 | Hahn et al. | |
| 7,150,845 B1 | 12/2006 | Gram | |

(Continued)

FOREIGN PATENT DOCUMENTS

| | | |
|---|---|---|
| EP | 1 058 612 B1 | 9/2004 |
| EP | 1 237 701 B1 | 8/2006 |
| GB | 839015 A | 6/1960 |
| JP | 55-095544 A | 7/1980 |

OTHER PUBLICATIONS

Gram Technology Brochure, "Innovative Molding Solutions", 2008.

*Primary Examiner* — Jill L Heitbrink
(74) *Attorney, Agent, or Firm* — Medler Ferro PLLC

(57) ABSTRACT

A multi-material injection molding machine includes stationary and moving platens holding cores and first and second injection units for delivering first and second molding materials. The moving platen is slidable towards and away from the stationary platen. Further provided is a rotational distribution unit movable between the stationary platen and the moving platen and defining first cavities on one side and second cavities on an opposite side. The first cavities are for mating with cores to define first mold cavities and the second cavities are for mating with cores to define second mold cavities. Also provided are a rotational actuator for rotating the rotational distribution unit and a molding material delivery apparatus for delivering one or more of the first molding material to the first cavities and the second molding material to the second cavities.

22 Claims, 8 Drawing Sheets

U.S. PATENT DOCUMENTS

| | | |
|---|---|---|
| 7,284,979 B2 | 10/2007 | Mai |
| 7,320,591 B2 | 1/2008 | Gram |
| 7,455,516 B2 * | 11/2008 | Glashagen et al. ........... 425/572 |
| 2004/0124558 A1 | 7/2004 | Gram |
| 2004/0211509 A1 | 10/2004 | Hartlmeier et al. |
| 2006/0082029 A1 | 4/2006 | Mai |
| 2006/0244178 A1 | 11/2006 | Armbruster |
| 2008/0154418 A1 | 6/2008 | MacDonald et al. |

* cited by examiner

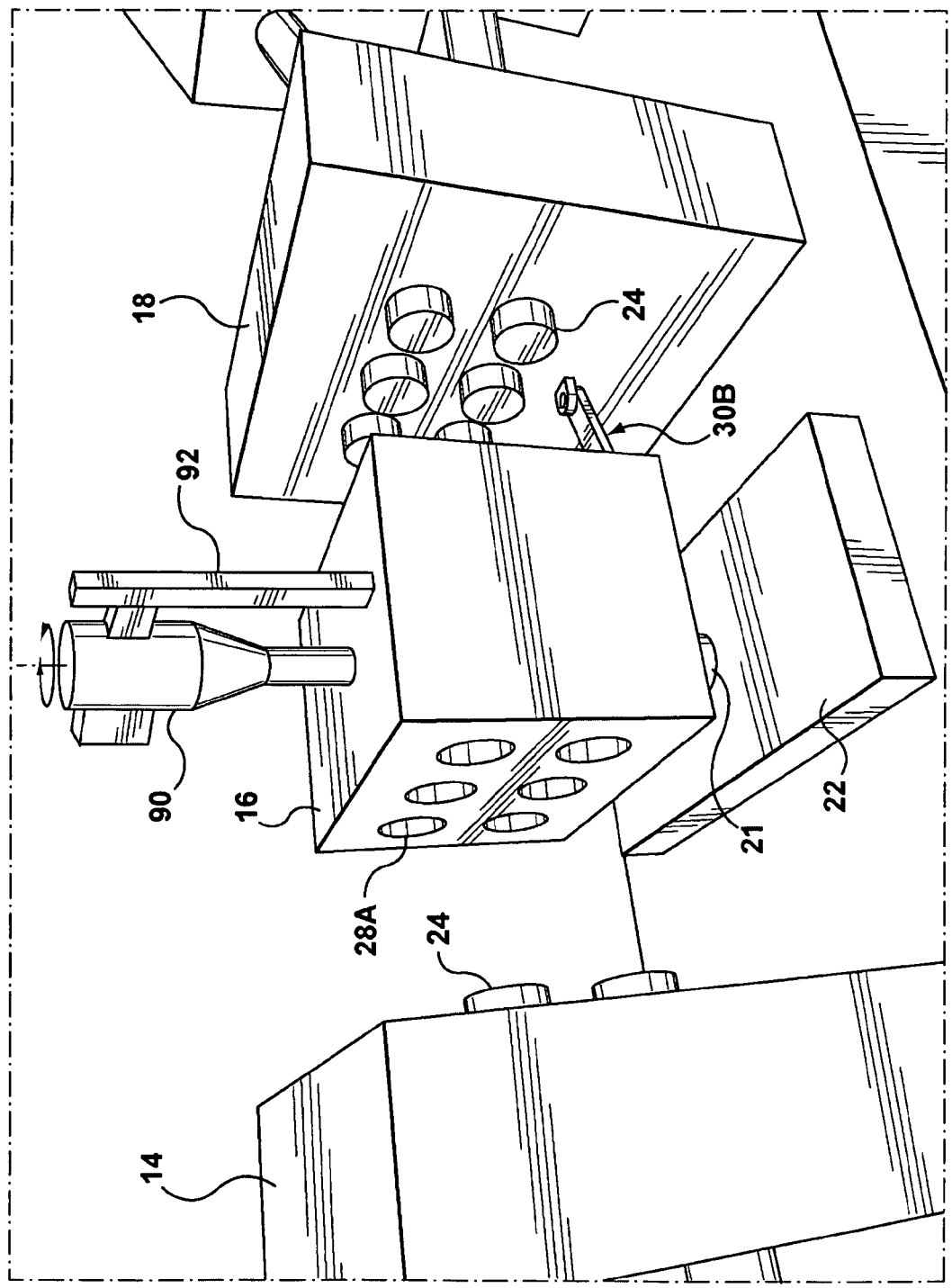

MULTI-MATERIAL INJECTION MOLDING APPARATUS AND METHOD

CROSS REFERENCE TO RELATED APPLICATION

This application claims the benefit of U.S. provisional patent application No. 61/045,272 filed Apr. 15, 2008, which is hereby incorporated by reference in its entirety herein.

FIELD OF THE INVENTION

The present invention relates to injection molding, and more particularly, to a multi-material injection molding apparatus and method.

BACKGROUND OF THE INVENTION

Multi-material injection molding machines and molds using a rotary mold section have been used to either optimize the molding process or add auxiliary operations or increase the output of molded parts.

In some applications the multi-material molding systems are bulky and take up a lot of floor space. One reason for this is that the injection barrels (extruders) are typically arranged at 90 or 180 degrees with respect to each other.

BRIEF SUMMARY OF THE INVENTION

According to one aspect of the present invention, a multi-material injection molding machine includes stationary and moving platens holding cores and first and second injection units for delivering first and second molding materials. The moving platen is slidable towards and away from the stationary platen. Further provided is a rotational distribution unit movable between the stationary platen and the moving platen and defining first cavities on one side and second cavities on an opposite side. The first cavities are for mating with cores to define first mold cavities and the second cavities are for mating with cores to define second mold cavities. Also provided are a rotational actuator for rotating the rotational distribution unit and a molding material delivery apparatus for delivering one or more of the first molding material to the first cavities and the second molding material to the second cavities.

According to another aspect of the present invention, a multi-material injection molding machine includes a frame, a stationary platen connected to the frame and holding cores, and a moving platen slidably connected to the frame and holding cores. The moving platen is slidable towards and away from the stationary platen. Further provided are a first injection unit for delivering first molding material and a second injection unit for delivering second molding material. A rotational distribution unit is disposed between the stationary platen and the moving platen and defines first cavities on one side and second cavities on an opposite side. The first cavities are for mating with cores to define first mold cavities and the second cavities are for mating with cores to define second mold cavities. A rotational actuator supports the rotational distribution unit for rotating the rotational distribution unit. The rotational actuator is connected to the frame and slidable towards and away from the stationary platen. A molding material delivery apparatus is connected between the stationary platen and the rotational distribution unit for delivering one or more of the first molding material to the first cavities and the second molding material to the second cavities.

According to another aspect of the present invention, a method of injection molding includes steps of providing a rotational distribution unit defining first cavities and second cavities, mating the first cavities with cores to define first mold cavities, injecting a first molding material into the first mold cavities, removing the first cavities from the cores where the injected first molding material remains on the cores as intermediate products, rotating the rotational distribution unit, mating the second cavities with the cores having the intermediate products to define second mold cavities, injecting a second molding material into the second mold cavities to form a finished product, removing the second cavities from the cores, and ejecting the finished products.

BRIEF DESCRIPTION OF THE FIGURES

Embodiments of the present invention will now be described more fully with reference to the accompanying drawings.

FIG. 8 is a perspective view of the region around the rotational distribution unit and an auxiliary injection unit according to another embodiment of the present invention.

DETAILED DESCRIPTION OF THE INVENTION

Figure 1:
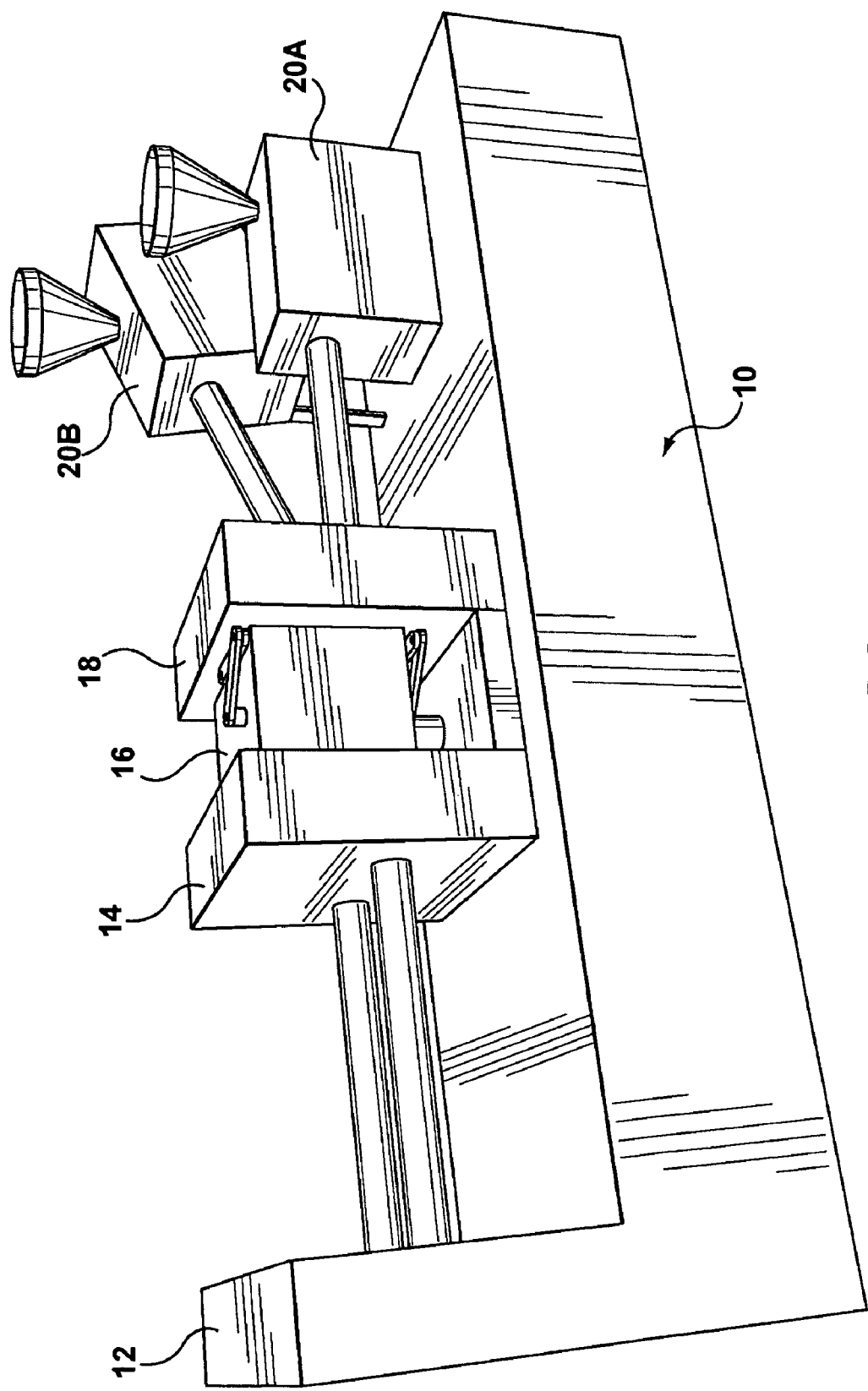
FIG. 1 is a perspective view of a multi-material injection molding machine according to an embodiment of the present invention.

FIG. 1 is a perspective view of a multi-material injection molding machine 10 according to an embodiment of the present invention. The features and aspects of the other embodiments can be used with this embodiment.

The injection molding machine 10 has a frame that includes a back plate 12. The frame is a generally supporting body that can include a supporting structure, such as a base, as well as tie-bars, rails, and other mechanical features of injection molding machines. A moving platen 14 is movably connected to the back plate 12 and can be slid with respect to the back plate 12. A rotational distribution unit 16 is situated between the moving platen 14 and a stationary platen 18 also connected to the frame. Both the moving platen 14 and the rotational distribution unit 16 are slidable towards and away from the stationary platen 18.

On the other side of the stationary platen 18 are injection units 20A, 20B. The injection units 20A, 20B can be positioned as shown, where one unit is above and to the side of the other so that its injection nozzle can be positioned near the injection nozzle of the other, or can be side-by-side or otherwise arranged differently than shown. The injection units 20A, 20B are on the same side of the stationary platen 18 and are near each other. Each injection unit 20A, 20B includes components suitable for the material to be molded, which, in the case of thermoplastic injection molding, can include a barrel having a plasticizing screw, heaters, and a resin hopper. Injection units for other materials (e.g., thermosets, metals, etc) have other components and features. In another embodiment, an injection unit, such as an auxiliary removable injection unit, is located above or beside the stationary platen 18 and may be bolted to the stationary platen 18.

The injection molding machine 10 also has a controller (not shown) for controlling its operations.

In FIG. 1 the mold is closed, meaning that the moving platen 14, rotational distribution unit 16, and stationary platen 18 are sandwiched together.

Figure 2:
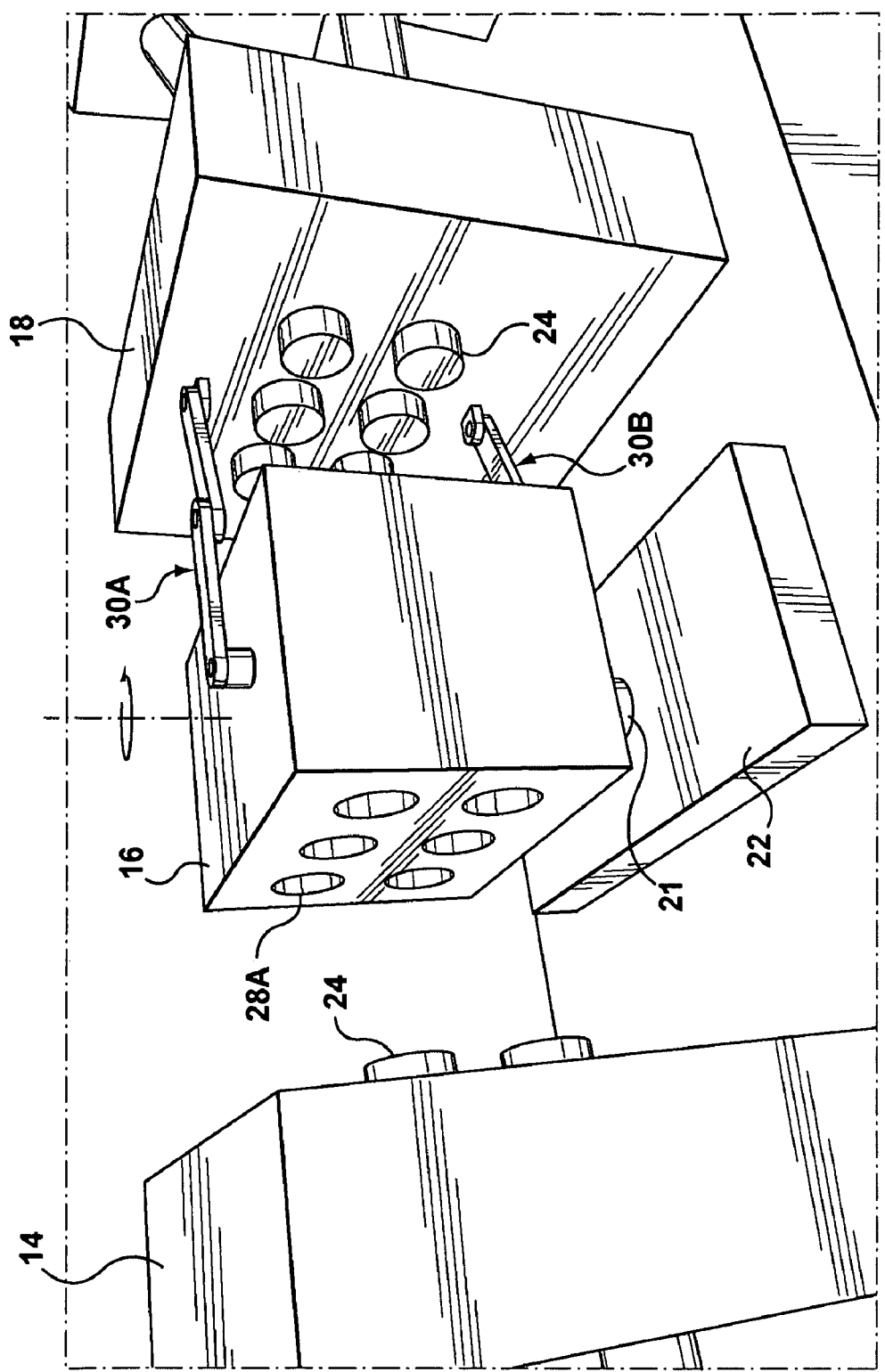
FIG. 2 is a perspective view of a region around the rotational distribution unit when the mold is open.

FIG. 2 is a perspective view of the region around the rotational distribution unit 16 when the mold is open.

As can be seen, the stationary platen 18 is connected to the frame and holds projecting cores 24, which can be formed on a separate plate, such as a mold or core plate, that is attached to the stationary platen 18.

The moving platen 14 is slidably connected to the frame and holds projecting cores 24, which can be formed on a separate plate, such as a mold or core plate, that is attached to the moving platen 14. The moving platen 14 can be slid towards and away from the stationary platen 18.

The first and second injection units 20A, 20B (FIG. 1) are for delivering first and second molding materials, respectively, through the stationary platen 18. The first and second molding materials are different in some way (i.e., different colors, compositions, fillers, injection temperatures or pressures, etc). In this disclosure "A" indicates components associated with the first material and "B" indicates components associated with the second material. The stationary platen 18 and/or the connected plate to which cores 24 are attached have channels that convey the first and second materials.

The rotational distribution unit 16 is disposed between the stationary platen 18 and the moving platen 14. The rotational distribution unit 16 is supported by a rotational actuator 21, such as a hydraulically or electrically actuated swivel or pivot, mounted on a base plate 22. The base plate 22 is connected to the frame (or a member thereof, such as a rail or tie-bar) and can be actuated to slide in the same direction as the moving platen 14. As such, the rotational distribution unit 16 is rotatable in the direction of the arrow of FIG. 2 (and the opposite direction) and slidable towards and away from the stationary platen 18. In other words, the rotational distribution unit 16 is rotatable about an axis normal to a plane in which the rotational distribution unit 16 slides (i.e., a vertical axis). In this embodiment, the rotational distribution unit 16 rotates 180 degrees from the position shown (in the arrow direction) and back again. U.S. Pat. No. 6,709,251, which is incorporated by reference in its entirety herein, describes an example of a similar rotating mold support that can be used with the embodiments described herein.

The rotational distribution unit 16 has first cavities 28A defined on one side and second cavities 28B (FIG. 3) defined on an opposite side. The first and second cavities 28A, 28B are for mating with the cores 24 to define respective first and second mold cavities. That is, each core 24 mates with one first cavity 28A and one second cavity 28B to define two different mold cavities for multi-material molding, over-molding, or similar process.

The first cavities 28A are different from the second cavities 28B, so that each of the different materials has space to occupy during injection.

Intermediate products are held on the cores 24. Ejection of finished products alternates between the moving platen 14 and the stationary platen 18. For example, if the second cavities 28B are for injecting a finishing over-molding material, then the finished products will be ejected from whichever platen the second cavities 28B have just been separated from.

Consider an example where the cavities 28A are identical to the cavities 28B except that the cavities 28A are shallower by 1 mm, and the cores 24 are all the same. The cores 24 on the moving platen 14 mate with the cavities 28A to define first mold cavities. The first material is then injected into the first mold cavities. The mold is opened and the intermediate products are held on the cores 24. The rotational distribution unit 16 is rotated and the mold is closed to mate the cores 24 on the moving platen 14 with the deeper cavities 28B to define second mold cavities. Then the second, over-molding material is injected into the second mold cavities and thus onto the intermediate products to form finished products. The mold is then opened and the finished products are ejected from the moving platen 14. The same process happens at the stationary platen 18.

In another embodiment, ejection occurs at the cavities 28B. In this case, the intermediate products are held on cores 24 after the first material is injected. Then, finished products are removed from cores 24 by the cavities 28B after the second material is injected. The finished products are then ejected from the cavities 28B. In all embodiments, ejection is accomplished by ejector pins, ejector plates, or the like.

A molding material delivery apparatus is connected between the stationary platen 18 and the rotational distribution unit 16 to deliver first molding material to the first cavities 28A and deliver second molding material to the second cavities 28B.

In this embodiment, the molding material delivery apparatus includes sprue bar linkages 30A, 30B connected to the stationary platen 18 and to the rotational distribution unit 16. As shown in FIG. 2, the ends of the sprue bar linkages 30A, 30B connected to the stationary platen 18 are aligned with the center of rotation of the rotational distribution unit 16 in the direction of sliding of the rotational distribution unit 16, while the ends of the sprue bar linkages 30A, 30B connected to the rotational distribution unit 16 are offset from the center of rotation in a direction lateral to the direction of sliding of the rotational distribution unit 16. This arrangement allows the sprue bar linkages 30A, 30B to continually connect the stationary platen 18 to the rotational distribution unit 16 while the rotational distribution unit 16 is slid and rotated with respect to the stationary platen 18, so as to provide a continuous path for molding material.

Figure 3:
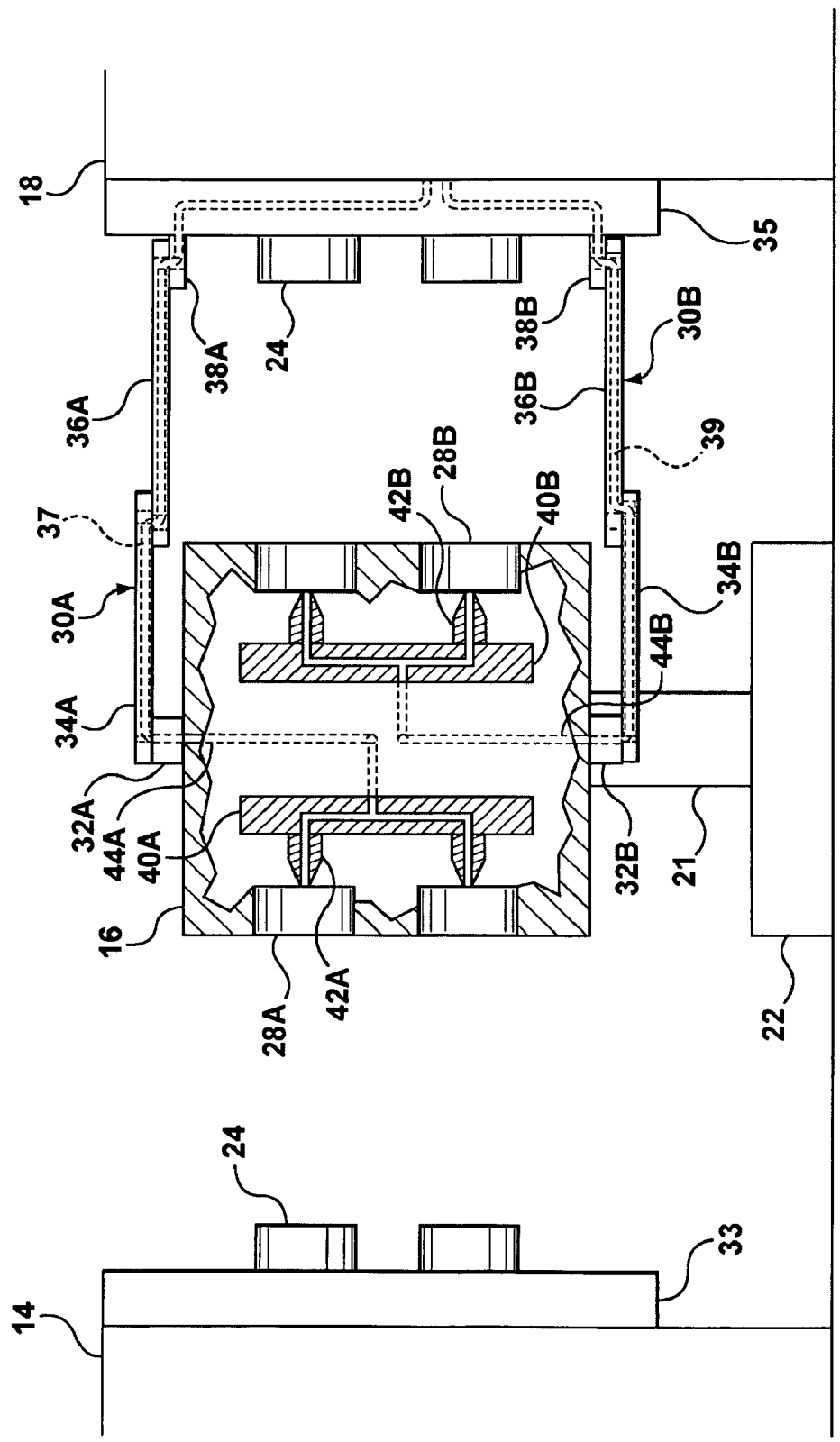
FIG. 3 is a side view showing the rotational distribution unit in cross-section along with the sprue bar linkages and surrounding components.

FIG. 3 shows the rotational distribution unit 16 in cross-section along with the sprue bar linkages 30A, 30B and surrounding components. Mold plates 33, 35, on which the cores 24 are disposed, are shown connected to the platens 14, 18.

The sprue bar linkage 30A includes a first pivot piece 32A fixed to the top of the rotational distribution unit 16, a first bar 34A pivotally connected to the first pivot piece 32A, a second bar 36A pivotally connected to the first bar 34A, and a second pivot piece 38A pivotally connected to the second bar 36A and fixed to the mold plate 35. The first pivot piece 32A, first bar 34A, second bar 36A, and second pivot piece 38A have internal channels (indicated collectively at 37) for conveying the first molding material. At the pivot joints, a pivot-compatible leak-proof fluid connection is used. Alternatively, these internal channels are not leak-proof and instead accommodate and protect flexible hoses. The sprue bar linkage 30A conveys first molding material through the channel 37 to a channel 44A of the rotational distribution unit 16.

The sprue bar linkage 30B has similar structure, namely a first pivot piece 32B, a first bar 34B, a second bar 36B, and a second pivot piece 38B interconnected in a similar manner and functioning in the same way, except that the sprue bar linkage 30B is connected to the bottom of the rotational distribution unit 16. The sprue bar linkage 30B conveys second molding material through a channel 39 to a channel 44B of the rotational distribution unit 16.

The sprue bar linkages 30A, 30B can also have heaters, such as embedded heaters, plate heaters, or film heaters, to keep the molding material at a suitable temperature.

U.S. Pat. No. 5,540,580, which is incorporated by reference in its entirety herein, describes an example of a similar sprue bar linkage that can be used with the embodiments described herein.

The first pivot pieces 32A, 32B can include shooting pots having valve gates to control injection pressures and the timing of injecting the first and second molding materials. The shooting pots allow reduction of pressures of molding materials in the sprue bar linkages 30A, 30B, as well as offer the ability to meter out delivery of the molding materials.

The channel 44A inside the rotational distribution unit 16 can be defined by an inlet component (not shown). A manifold 40A is provided inside the rotational distribution unit 16 and has a manifold channel connected to the channel 44A. Nozzles 42A are connected to the manifold 40A and have nozzle channels connected to the manifold channel to feed first molding material to the cavities 28A. The nozzles 42A can be valve gated or thermally gated. The nozzles 42A and manifold 40A can have heaters and thermocouples and can collectively be termed a hot runner. Electricity or fluid (for actuators or cooling) needed for the operation of the manifold 40A and nozzles 42A can be provided by wires or hoses run along the sprue bar linkage 30A or separate from such. Hoses and wires can be sized and restrained to prevent crushing when the mold closes. Rotary couplings can be used to facilitate connection of wires or hoses. Suitable wiring/hose harnesses and rotary couplings are known in the art.

A manifold 40B and nozzles 42B are similarly provided between the channel 44B and cavities 28B. The rotational distribution unit 16 is made up of or contains plates that serve to hold the manifolds 40A, 40B and nozzles 42A, 42B, such as plates used in a conventional hot half. Such plates are omitted from the figures for the sake of clarity.

In the arrangement shown, the manifolds 40A, 40B can be termed back-to-back manifolds. In another embodiment, a single manifold with different channels for the first and second molding materials is used rather than two separate manifolds. Such a single manifold can be made of several plates brazed together.

In another embodiment, the rotational distribution unit 16 contains a cold runner, which for illustrative purposes, is represented by the manifold 40A, 40B and nozzles 42A, 42B. A cold runner is useful in certain applications, such as when molding liquid silicone rubber (LSR).

It follows that one hot runner and one cold runner can be provided should an application warrant. In such an embodiment, it may be desirable to separate the manifolds 40A, 40B by a thermal barrier, such as by an air gap or region of insulating material. A thermal barrier may also be used in a dual hot runner system in which each hot runner operates at a different temperature.

As evident from FIG. 3, the sprue bar linkages 30A, 30B can deliver their respective molding materials to their respective cavities 28A, 28B regardless of the rotational position of the rotational distribution unit 16, and in this embodiment, regardless of the translational position of the rotational distribution unit 16 with respect to the stationary platen 18.

In another embodiment, the sprue bar linkages 30A, 30B can each have more than two bars.

Figure 4:
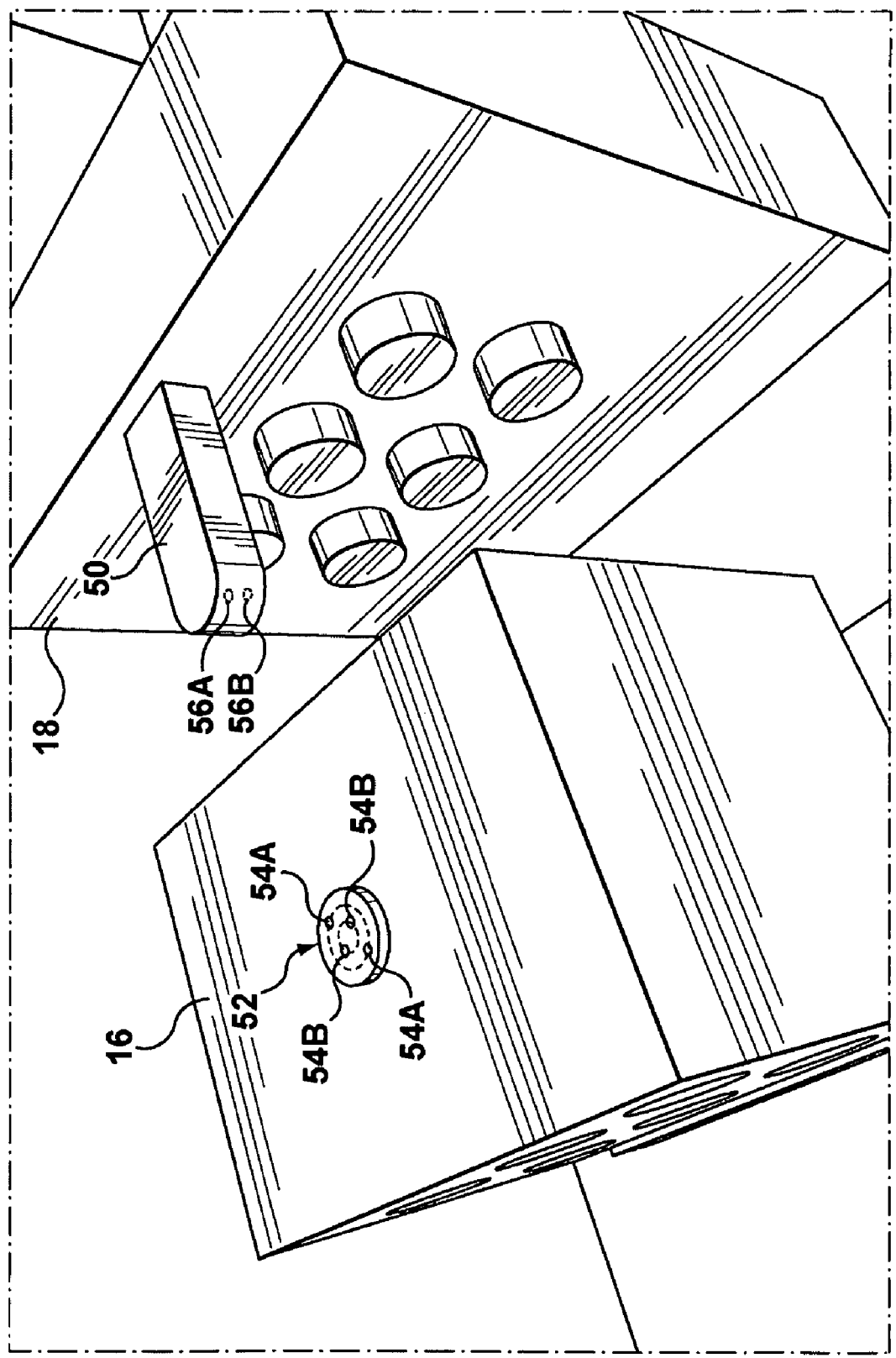
FIG. 4 is a perspective view of a molding material delivery apparatus having rotationally congruent inlets according to another embodiment of the present invention.

FIG. 4 is a perspective view of a molding material delivery apparatus according to another embodiment of the present invention. The features and aspects of the other embodiments can be used with this embodiment.

In this embodiment, the molding material delivery apparatus includes a sprue bar 50 and a distribution plate 52.

The distribution plate 52 is disposed at the center of the top surface of the rotational distribution unit 16. The distribution plate 52 includes two inlets 54A disposed on a radius from the center of the rotational distribution unit 16. Each inlet 54A is rotationally congruent with the other on a 180 degree rotation of the rotational distribution unit 16.

The sprue bar 50 extends from the stationary platen 18. The sprue bar 50 has an outlet 56A (hidden) that aligns with one of the inlets 54A when the mold is closed. The inlet 54A to which the outlet 56A aligns depends on the orientation of the rotational distribution unit 16. The other inlet 54A is blocked by the body of the sprue bar 50. The inlets 54A lead to a common channel, so that first molding material can be fed to the first cavities 28A regardless of which inlet 54A is aligned to the outlet 56A.

In a similar arrangement, the distribution plate 52 includes two inlets 54B and the sprue bar 50 includes a corresponding outlet 56B (hidden) for delivery of the second molding material. The inlets 54B are disposed on a different radius from the inlets 54A to reduce cross-contamination of molding materials.

The sprue bar 50 and distribution plate 52 can be designed to wedge against each other to achieve a good seal. One way of doing this is to slope the mating surfaces of the sprue bar 50 and distribution plate 52 so that as the sprue bar 50 and distribution plate 52 are brought together, the mating surface bearing forces increase.

Because the delivery path for molding material is interrupted when the mold is opened, the inlets 54A, 54B and/or outlets 56A, 56B can optionally have close-off features, such as spring loaded gates or valve-to-valve assemblies, to reduce drooling. U.S. Pat. No. 6,835,060, which is incorporated by reference in its entirety herein, describes an example of a close-off that can be used.

It should be noted that in this embodiment, back-and-forth rotation of the rotational distribution unit 16 is not required, and rotation in one direction can be used instead.

Figure 5:
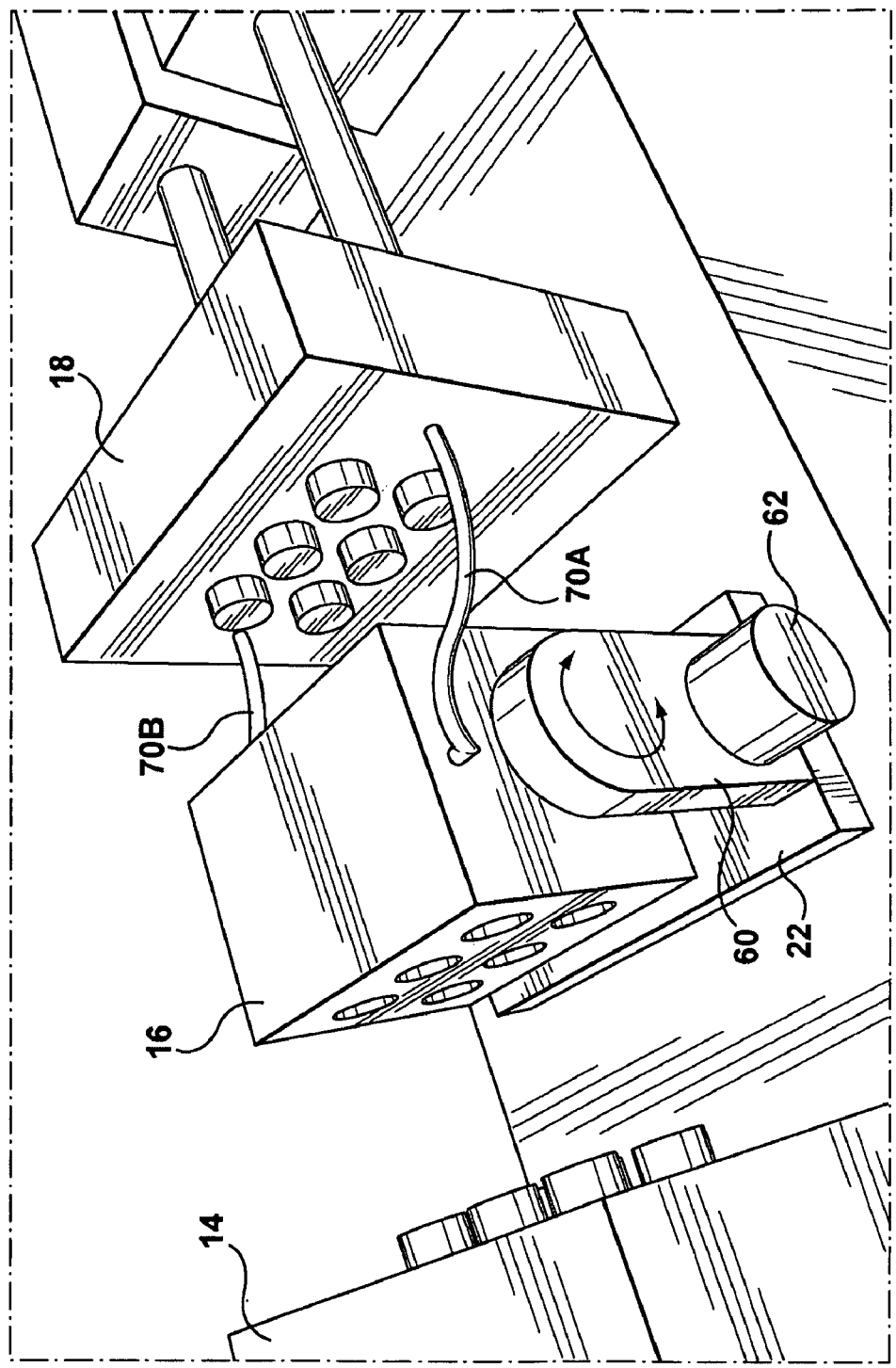
FIG. 5 is a perspective view of a molding material delivery apparatus having flexible hoses according to another embodiment of the present invention.

FIG. 5 is a perspective view of a molding material delivery apparatus according to another embodiment of the present invention. The features and aspects of the other embodiments can be used with this embodiment.

The rotational distribution unit 16 is pivotally connected to a rotational actuator having flanges 60 (one not shown) that extend upwards from the base plate 22, and can rotate 180 degrees in the direction of the arrow and back again. A motor 62, such as an electric or hydraulic motor, drives the rotation of the rotational distribution unit 16. As can be seen, the rotational distribution unit 16 is rotatable about an axis parallel to the plane in which the rotational distribution unit 16 slides (i.e., a horizontal axis).

In this embodiment, the molding material delivery apparatus includes flexible hoses 70A, 70B, such as metal, metal braid, or composite material hoses suitable for the specific molding conditions. The flexibility of the hoses 70A, 70B accommodates both rotation and translation of the rotational distribution unit 16, and thus provides continuous paths for the molding materials. The ends of the hoses 70A, 70B coupled to the rotational distribution unit 16 are located to avoid interference with the pivot. In the embodiment shown, except at the pivot, gaps exist between the flanges 60 and the rotational distribution unit 16 to accommodate the hoses 70A, 70B. The hoses 70A, 70B can further be sized and restrained to prevent crushing when the mold closes. Rotary couplings can be employed if desired.

Also shown in FIG. 5 is a side-by-side arrangement of the injection units 20A, 20B.

Figure 6:
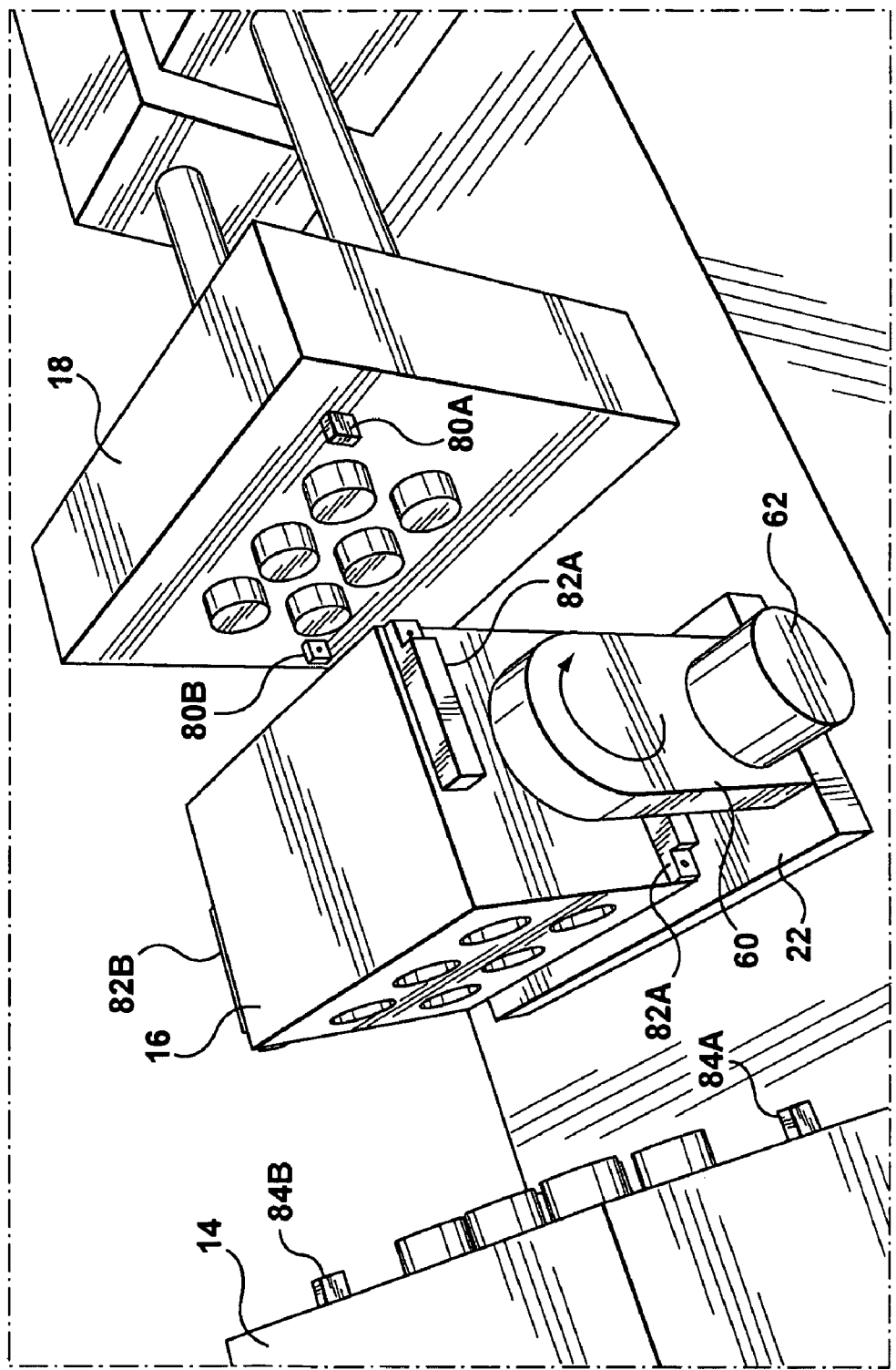
FIG. 6 is a perspective view of another molding material delivery apparatus having rotationally congruent inlets according to another embodiment of the present invention.

FIG. 6 is a perspective view of a molding material delivery apparatus according to another embodiment of the present invention. The features and aspects of the other embodiments can be used with this embodiment.

In this embodiment, the molding material delivery apparatus comprises a set of separable sprue bars for the first molding material and a set of separable sprue bars for the second molding material.

The set of separable sprue bars for the first molding material includes two sprue bars 82A connected to a lateral surface of the rotational distribution unit 16 and having inlets feeding a common internal channel, a sprue bar 80A connected to the stationary platen 18 and having an outlet, and a blind 84A connected to the moving platen 14. The two sprue bars 82A are arranged such that their inlets are rotationally congruent, so that the outlet of the sprue bar 80A can align with either inlet depending on the orientation of the rotational distribution unit 16. The blind 84A is placed to close off the inlet of the sprue bar 82A that is not aligned with the outlet of the sprue bar 80A.

In a similar arrangement, the set of separable sprue bars for the second molding material includes two sprue bars 82B, a sprue bar 80B, and a blind 84B.

As with the embodiment of FIG. 4, because the delivery path for molding material is interrupted when the mold is opened, the sprue bars 82A, 82B and 80A, 80B can optionally have close-off features, such as spring loaded gates or valve-to-valve assemblies, to reduce drooling.

Figure 7:
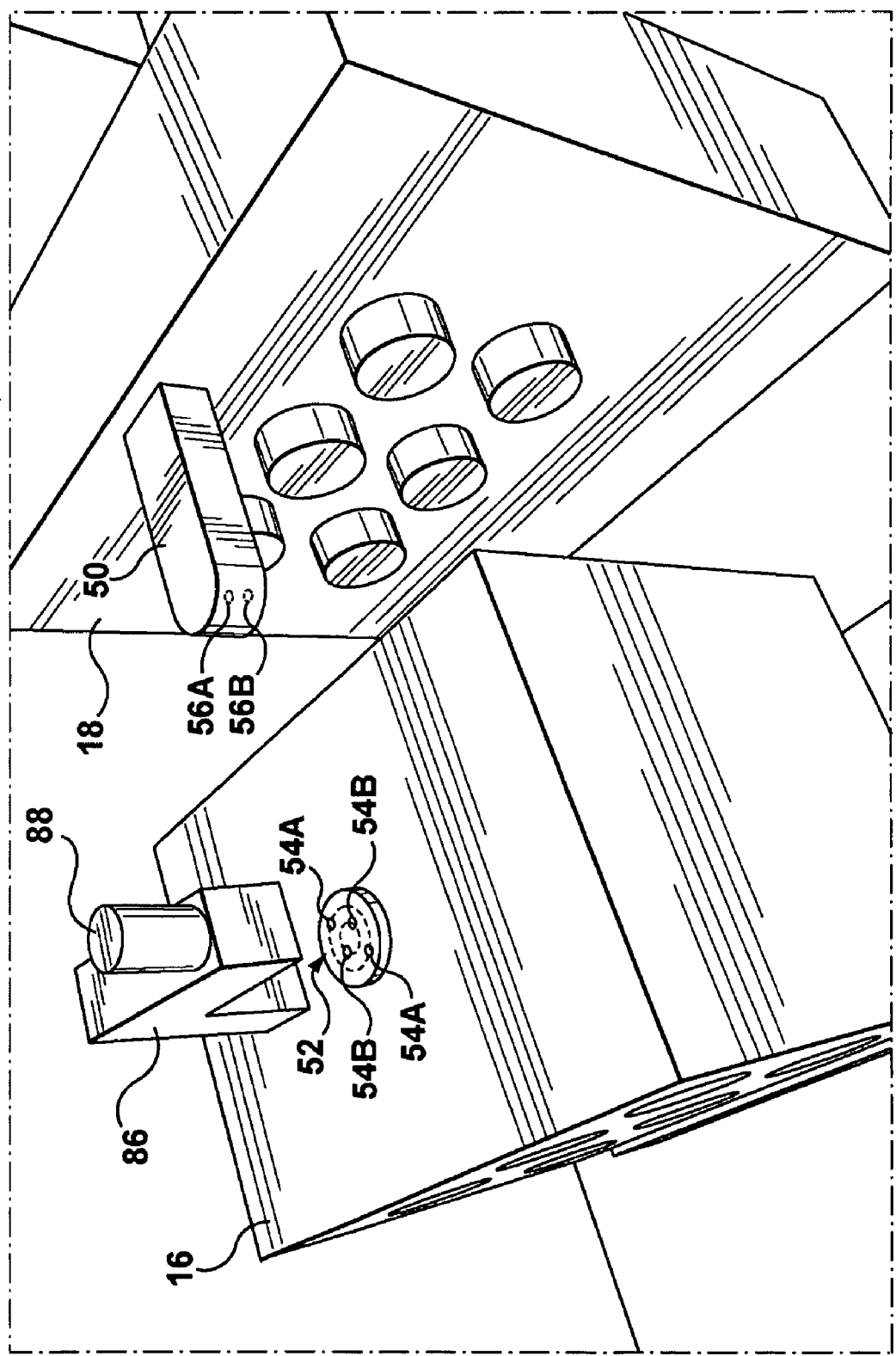
FIG. 7 is a perspective view of a molding material delivery apparatus having a ram for sealing according to another embodiment of the present invention.

FIG. 7 is a perspective view of a molding material delivery apparatus according to another embodiment of the present invention. The features and aspects of the other embodiments can be used with this embodiment. The embodiment of FIG. 7 is similar to that of FIG. 4 and only differences are described in detail.

An L-shaped arm 86 is attached to and extends from the top of the rotational distribution unit 16. The arm 86 is shaped to allow clearance for the sprue bar 50 in both mold-closed orientations of the rotational distribution unit 16. Attached to the arm 86 directly above the distribution plate 52 is a ram 88, such as a hydraulic cylinder or electric actuator. When the mold is closed, the ram 88 is activated to press the sprue bar 50 into forceful contact with the distribution plate 52 to reduce the chance of leakage.

FIG. 8 is a perspective view of the region around the rotational distribution unit according to another embodiment of the present invention. The features and aspects of the other embodiments can be used with this embodiment. The embodiment of FIG. 8 is similar to that of FIG. 2 and only differences are described in detail.

Instead of two sprue bar linkages 30A, 30B, only one sprue bar linkage 30B is provided. The sprue bar linkage 30B provides the second molding material as previously described. The first molding material is provided via an auxiliary injection unit 90 (first injection unit) attached directly to the rotational distribution unit 16. The auxiliary injection unit 90 includes an injection screw, molding material hopper, and other components for delivering the first molding material. The center of rotation of the auxiliary injection unit 90 is aligned with the center of rotation to the rotational distribution unit 16 and is supported by a frame 92 extending from the top of the rotational distribution unit 16. The auxiliary injection unit 90 rotates and translates with the rotational distribution unit 16. U.S. Pat. No. 6,994,810, which is incorporated by reference in its entirety herein, describes an example of an auxiliary injection unit that can be used with the embodiments described herein.

In another embodiment, several rotational distribution units 16 are placed side by side between the stationary platen 18 and the moving platen 14.

In another embodiment, transfer of molding material to the rotational distribution unit 16 can be achieved by a valve-to-valve arrangement of the kind used in non-rotating stack molding. U.S. Pat. No. 6,955,534, which is incorporated by reference in its entirety herein, describes an example of such a valve-to-valve arrangement.

In another embodiment, the stationary platen 18 is replaced by another movable platen. In this embodiment, the rotational distribution unit 16 need not slide, but rather the two platens slide towards and away from the rotational distribution unit 16.

In another embodiment, the first material is core-gated at the stationary platen 18 while the second material is delivered by one of the molding material delivery apparatuses described herein.

In general, the rotational distribution unit 16 can be a standalone mold component attached to and fully removable from the machine 10 or can be an integral part of the machine 10.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. A method of injection molding comprising:
    using a rotational distribution unit defining first cavities and second cavities, the rotational distribution unit including at least one channel for conveying at least one of a first molding material and a second molding material;
    translating the rotational distribution unit to mate the first cavities with cores to define first mold cavities;
    injecting the first molding material into the first mold cavities;
    removing the first cavities from the cores, the injected first molding material remaining on the cores as intermediate products;
    rotating the rotational distribution unit;
    translating the rotational distribution unit to mate the second cavities with the cores having the intermediate products to define second mold cavities;
    injecting a second molding material into the second mold cavities to form a finished product;
    removing the second cavities from the cores; and
    ejecting the finished products.

2. The method of claim 1, further comprising:
    performing the mating and injecting steps at the second cavities mated with additional cores, while the first cavities are mated with the cores; and
    performing the mating and injecting steps at the first cavities mated with the additional cores, while the second cavities are mated with the cores.

3. A multi-material injection molding machine, comprising:
- a stationary platen holding cores;
- a moving platen holding cores, the moving platen slidable towards and away from the stationary platen;
- a first injection unit for delivering a first molding material;
- a second injection unit for delivering a second molding material;
- a rotational distribution unit movable between the stationary platen and the moving platen and defining first cavities on one side and second cavities on an opposite side, the first cavities for mating with cores to define first mold cavities and the second cavities for mating with cores to define second mold cavities, the rotational distribution unit including at least one channel for conveying at least one of the first molding material and the second molding material from at least one of the first injection unit and the second injection unit to at least one of the first cavities and the second cavities; and
- a rotational actuator for rotating the rotational distribution unit.

4. The multi-material injection molding machine of claim 3, further comprising a molding material delivery apparatus for delivering one or more of the first molding material and the second molding material from the first injection unit and the second injection unit to the at least one channel of the rotational distribution unit.

5. The multi-material injection molding machine of claim 4, wherein the molding material delivery apparatus comprises a sprue bar linkage for the first molding material and another sprue bar linkage for the second molding material.

6. The multi-material injection molding machine of claim 4, wherein the molding material delivery apparatus comprises:
- at least one sprue bar extending from the stationary platen and having an outlet for first molding material and an outlet for second molding material;
- two rotationally congruent inlets disposed on the rotational distribution unit for first molding material; and
- two rotationally congruent inlets disposed on the rotational distribution unit for second molding material;
- wherein when the first and second cavities are mated with cores, the outlet for first molding material is aligned with one of the two inlets for first molding material and the outlet for second molding material is aligned with one of the two inlets for second molding material.

7. The multi-material injection molding machine of claim 4, wherein the molding material delivery apparatus comprises a first flexible hose for the first molding material and a second flexible hose for the second molding material.

8. The multi-material injection molding machine of claim 4, wherein the molding material delivery apparatus delivers the second molding material to the rotational distribution unit, and wherein the first injection unit is an auxiliary injection unit directly attached to the rotational distribution unit for delivering the first molding material to the rotational distribution unit.

9. The multi-material injection molding machine of claim 4, wherein the molding material delivery apparatus delivers only the second molding material to the rotational distribution unit and the first material is core-gated at the stationary platen.

10. The multi-material injection molding machine of claim 3, wherein the at least one channel of the rotational distribution unit is a first hot runner for conveying the first molding material to the first cavities.

11. The multi-material injection molding machine of claim 10, wherein the rotational distribution unit includes a second hot runner therein for conveying the second molding material to the second cavities.

12. The multi-material injection molding machine of claim 3, wherein the first and second injection units are on the same side of the stationary platen.

13. A multi-material injection molding machine, comprising:
- a frame;
- a stationary platen connected to the frame and holding cores;
- a moving platen slidably connected to the frame and holding cores, the moving platen slidable towards and away from the stationary platen;
- a first injection unit for delivering a first molding material;
- a second injection unit for delivering a second molding material;
- a rotational distribution unit disposed between the stationary platen and the moving platen and defining first cavities on one side and second cavities on an opposite side, the first cavities for mating with cores to define first mold cavities and the second cavities for mating with cores to define second mold cavities, the rotational distribution unit including at least one channel for conveying at least one of the first molding material and the second molding material from at least one of the first injection unit and the second injection unit to at least one of the first cavities and the second cavities; and
- a rotational actuator supporting the rotational distribution unit for rotating the rotational distribution unit, the rotational actuator connected to the frame and slidable towards and away from the stationary platen.

14. The multi-material injection molding machine of claim 13, further comprising a molding material delivery apparatus for delivering one or more of the first molding material and the second molding material from the first injection unit and the second injection unit to the at least one channel of the rotational distribution unit.

15. The multi-material injection molding machine of claim 14, wherein the molding material delivery apparatus comprises a sprue bar linkage for the first molding material and another sprue bar linkage for the second molding material.

16. The multi-material injection molding machine of claim 14, wherein the molding material delivery apparatus comprises:
- at least one sprue bar extending from the stationary platen and having an outlet for first molding material and an outlet for second molding material;
- two rotationally congruent inlets disposed on the rotational distribution unit for first molding material; and
- two rotationally congruent inlets disposed on the rotational distribution unit for second molding material;
- wherein when the first and second cavities are mated with cores, the outlet for first molding material is aligned with one of the two inlets for first molding material and the outlet for second molding material is aligned with one of the two inlets for second molding material.

17. The multi-material injection molding machine of claim 14, wherein the molding material delivery apparatus comprises a first flexible hose for the first molding material and second flexible hose for the second molding material.

18. The multi-material injection molding machine of claim 14, wherein the molding material delivery apparatus delivers the second molding material to the rotational distribution unit, and wherein the first injection unit is an auxiliary injection unit attached to the rotational distribution unit for delivering the first molding material to the rotational distribution unit.

19. The multi-material injection molding machine of claim 14, wherein the molding material delivery apparatus delivers only the second molding material to the rotational distribution unit and the first material is core-gated at the stationary platen.

20. The multi-material injection molding machine of claim 13, wherein the at least one channel of the rotational distribution unit is a first hot runner for conveying the first molding material to the first cavities.

21. The multi-material injection molding machine of claim 20, wherein the rotational distribution unit includes a second hot runner therein for conveying the second molding material to the second cavities.

22. The multi-material injection molding machine of claim 13, wherein the first and second injection units are on the same side of the stationary platen.

* * * * *